May 2, 1961 T. C. LEIGHTON ET AL 2,982,173
MEANS FOR PRODUCING COLOR SEPARATION IMAGES
Filed March 12, 1957 3 Sheets-Sheet 1

INVENTORS,
THOMAS C. LEIGHTON,
LAWRENCE F. BRUNSWICK,
LIONEL H. WHEELER
BY
ATTORNEY.

May 2, 1961    T. C. LEIGHTON ET AL    2,982,173
MEANS FOR PRODUCING COLOR SEPARATION IMAGES
Filed March 12, 1957    3 Sheets-Sheet 3

THOMAS C. LEIGHTON
LAWRENCE F. BRUNSWICK
LIONEL H. WHEELER
    INVENTORS.

BY

ATTORNEY.

United States Patent Office 2,982,173
Patented May 2, 1961

2,982,173
MEANS FOR PRODUCING COLOR SEPARATION IMAGES

Thomas C. Leighton, South Pasadena, Lawrence F. Brunswick, North Hollywood, and Lionel H. Wheeler, Glendale, Calif., assignors to Colorvision, Inc., Los Angeles, Calif., a corporation of California Filed Mar. 12, 1957, Ser. No. 645,635

13 Claims. (Cl. 88—16.4)

This invention relates to improvements in optical systems and is particularly directed to an optical system for use in motion picture cameras, printers and the like whenever it is desired to obtain two or more color separation images upon a single emulsion or strip of photographic film in adjacent relation. The invention is also directed to an optical system for use with television cameras in color television systems. This application is a continuation-in-part of application, Serial No. 280,812, filed April 5, 1952, now abandoned, entitled "Method and Means for Producing Color Separation Images," inventors, Thomas C. Leighton and Lawrence F. Brunswick, the subject matter of said application Serial No. 280,812 being described and claimed in the present application.

In color photography it is necessary to obtain two, three or four color separation images of a given object such as, for example, images representing the red, the blue and green wave bands of light. These three images can subsequently be combined in a number of different manners and by the use of various techniques so as to obtain either a combined transparency which represents all of the colors naturally occurring in the subject being photographed, or these three color separation images may be projected in rapid succession or simultaneously through suitable color filters and by reason of the persistence of vision, a projected image in substantially natural color may be observed by the audience.

It is necessary that these color separation images be obtained simultaneously, particularly if the object being photographed is a moving object. If these images are obtained in rapid succession they will not be registered or superimposed properly during subsequent reproduction, and the reproduction is faulty and exhibits color fringes around the moving object. Moreover, these color separation images must be obtained from a single point of view, that is, through a single camera objective or taking lens. Some prior attempts to obtain two or more color separation negatives simultaneously but through separate lenses or lens elements having spaced optical axes have not been satisfactory because of parallax. The parallax also results in color fringes and this is particularly noticeable when the scene being photographed has any depth to it. Among the various color cameras which have been used in the past, various arrangements of beam splitting have been used. One prior color separation arrangement included a single taking lens, a half silvered mirror and three film strips, two of said film strips being used in face-to-face relation as a bipack, whereas the other strip was moved in a separate plane. Light filters were used between the films and the beam splitter for the purpose of transmitting selected wave length bands of light while absorbing other wave length bands. This system resulted in three separate films, each bearng images representing a single color separation. This system, in common with all other systems using absorption type light filters (which actually absorb and remove specified light frequencies) very materially reduces the total light intensity reaching the film and thereby necessitates the use of very high intensity illumination upon the object being photographed. Furthermore, since three separate film strips are used, the method involves a great deal of detailed laboratory work and presents the problem of registering images carried by three separate films during subsequent reproduction of the final colored image, it being readily understood that different film strips may have different shrinkage and expansion characteristics, etc.

It is to be understood that in these prior systems the taking lens or objective lens of the camera had to have a sufficiently long focal length to permit the light rays to be reflected or split by the beam splitter, to pass through the color filters and eventually reach and focus upon the film emulsion. By reason of geometry and linear measurements involved it was necessary to use lenses of relatively long focal length and it was not possible to use wide angle or wide aperture lenses because of the short focal length of such lenses and the wide angle of view; the latter required the use of relatively large reflecting or half silvered mirrors. This problem has been recognized heretofore and has given rise to a number of complicated and noncommercial expedients. There have also been some prior attempts to sidestep some of the difficulties by placing a prism block in front of two or three lenses, the single incoming beam being subdivided by the prism and the fractional beams, then set through lenses arranged with their axes parallel to focus images on adjacent areas of an emulsion, after passing through suitable light filters. It is apparent that such systems are impractical because less than one-third of the incoming light must be subjected to the action of each color separation image, and the diameter of the lenses used must be small. Therefore the resulting image must be small and widely spaced or the relative aperture must be small; the optical efficiency of the entire system is extremely low.

Some prior systems which employed split objectives, that is, combinations of two halves, each half maintaining its own original optical axis, the incoming light beam through each half being then refracted by suitable prisms so as to form two adjacent images upon a single strip of film, were not satisfactory for many reasons. These systems involved very high light losses, involved errors of parallax and in addition are subject to fringing in and out of form images.

It is to be remembered that in motion picture photography, it is highly desirable, in order to properly depict a story, to use various types of objective lenses, some of which may have a wide angle, a normal field angle, and still others a telephoto or narrow field angle. Any system which involves modification of the entire beam splitting arrangement every time the back focal length of an objective lens is changed may be impractical. Furthermore, when three or four color separation images are desired and it is necessary to use two or more beam splitters in series, some prior expedients and suggestions have failed. Moreover, some prior systems precluded the use of large diameter fixed lenses since the angular field of such lenses is at least 30° and the aperture of the prism reflector must accommodate the entire angular field of the object within a short linear distance. A prior system which would require two light splitting elements in series to permit simultaneous production of three color separation images might automatically require objectives of longer focal lengths and of small angle or aperture.

The present invention is directed to a novel optical system and method whereby the beam splitting system is independent of the focal length of the camera objective. In other words, an objective lens of any desired focal length can be used (from wide or narrow angle of view) without change or alteration of the beam splitting system.

The present invention appears to obviate all of the difficulties encountered heretofore. In accordance with the present invention a single objective lens is used thereby eliminating problems of parallax, fringing, lack of definition, etc. Various types of taking or objective lens can be used including those resulting in wide angle, normal angle, or narrow angle fields of coverage, without the necessity of making any other changes in the light splitting system. Due to the unique geometry of the optical system of this invention, image brilliance at the film plane is achieved which is many times brighter than normally expected in view of the aperture of the objective lens. Two or more color separation images can be simultaneously obtained in closely adjacent relation upon a single strip of film. The optical system of the present invention has an extremely high efficiency and permits production of three color separation images under the same conditions of object illumination as are generally used in panchromatic black and white photography. The present system insures the production of identical, registrable and superimposable images, and obviates the need for the tedious laboratory work, the use of dupes or intermediate prints, etc. Greater latitude is made available in exposure level, subject brightness range, depth of field, and choice of angle of view than has been thought possible heretofore.

Generally stated, the unusual advantages of the present system are made possible by providing a light splitting system which is interposed between any desired objective lens and the emulsion of a film. Such system preferably includes field lens means arranged to receive an image from the objective lens, the plane of such image having a fixed relationship to the rest of the light splitting system. Furthermore, the light splitting system is characterized by the use of dichroic mirrors or multi-layer interference dichroic beam splitters which reflect a desired portion of the spectrum and transmit the rest of the spectrum. This does not materially reduce the effective light intensity but simply divides the incoming light into desired wave length bands and is markedly different in its effect from the prior use of absorption type light filters. The system of the present invention is also characterized, in its application to three or four color separation work, by the use of a polyhedral block virtually adjacent to or immediately in front of the film. Lenses of relatively large aperture are used in picking up a relatively large image from the field lens and in focusing such images (with intervening reflection from the polyhedral block) upon closely adjacent emulsion areas of film.

The advantages of the present optical system are also readily usable in association with color television systems, wherein transmission of three color intelligence is desired. Prior proposed color television cameras required very high light levels as compared to the light levels required for black and white cameras. High light levels of television cameras of approximately 500 foot candles necessitates lamps drawing approximately four times the power requirements of normal black and white cameras. Obviously heavier lighting equipment is required, more heat is generated by the lighting system, and extra air-conditioning equipment must be used to reduce temperatures in a studio to suitable working conditions. Prior television cameras had low light-gathering efficiency and were made of long focal length. It has been difficult, if not impossible, to design long focal lengths of high relative aperture. For example, lens 6 to 10 inches in focal length usually have an effective aperture of $f$ 4.5 or $f$ 5.6, and are not capable of increasing image brightness by relay imaging assemblies to reduce the size of the final image.

It is an object of the present invention to provide methods and means for facilitating the production of two or more color separation images simultaneously upon a single film or upon image areas provided on faces of adjacent television cameras.

An object of this invention is to disclose and provide an optical system of high brilliance for simultaneous production of at least three separate but associated color separation images in different image areas of a single image plane, or in different image areas which do not lie in the same plane, and wherein said image areas may be provided on a motion picture film or on one or more television cameras.

An object of the invention is to provide methods and means whereby standard or usual motion picture cameras and optical printers can be converted into three color cameras and printers in a ready and facile manner.

An object of the invention is to provide a method of beam splitting and formation of color separation images which is independent of the focal length of the primary objective lens.

Another object of the invention is to provide methods and means whereby objective lenses, differing in angle of view and in focal length, can be used with the same beam splitting system.

This invention has for its object the provision of a photographic system which is capable of separating and recording color separation images of high brilliance and clarity and wherein loss of light transmitted by the system is reduced to a minimum.

Another object of this invention is to design and provide a color separation photographic system wherein means for effecting the color separation is mounted between the taking lens assembly and the camera housing of a motion picture camera.

A further object of this invention is to design and provide a color photographic system wherein an image containing substantially all of the light transmitted by a single taking lens is split up into three color images, each of the color images being relayed by mirror means and focused upon a single frame of a film strip in separate and adjacent relation.

A still further object of this invention is to design and provide a color separation and image relay means including a plurality of selected dichroic mirrors, a plurality of front surface mirrors for reflecting separate color images, and a plurality of reimaging relay lens assemblies transmitting said reflected color images to a film strip in adjacent relationship.

A still further object of the invention is to disclose and provide such an optical system wherein reflector means operatively arranged with respect to reimaging lens assemblies and serve to direct bands of light therefrom along divergent axes to television cameras.

Still another object of this invention is to disclose and provide an optical system as described immediately above wherein the television cameras are arranged in lateral disposition in a cluster about the exit portion of the color separation image optical system, whereby minimum space is required for the combined optical system and television camera systems.

Other objects and advantages of this invention will be readily apparent from the following description of the drawings, which illustrate an exemplary form of the invention. It is to be understood that the invention is not only applicable to motion picture cameras, but is also applicable to still cameras and printers.

Generally speaking, an exemplary form of this invention includes a color separation, photographic system which may be readily mounted as a unit between a taking lens assembly and a housing of a motion picture camera by making slight modifications in the base supporting the camera housing. The system may be carried upon a forwardly extended base of a camera housing and is simply and effectively mounted so as to receive light transmitted through a single taking lens assembly (or a normal turret) removably carried on a front wall of the extension. The system contemplates a pair of coaxial field lenses behind the taking lens assembly with an image plane lying between the two field lenses, the image formed at said plane having virtually all of the light transmitted through the taking lens from the subject being photographed. Behind the field lenses is mounted a first dichroic mirror which reflects a selected wave length band of light or spectral region of light, in this example, blue, to a pair of front surface reflecting mirrors which reflect a blue image to a reimaging relay lens assembly for transmitting the blue image to a portion of a panchromatic strip film, the blue image being reflected from a prism or polyhedral block. Behind the first dichroic mirror is mounted a second dichroic mirror adapted to receive the light transmitted by the first dichroic mirror and to reflect a selected wave length band of light, for example, red. The red image follows a substantially similar path as the blue image, being reflected from a pair of mirrors, transmitted through a reimaging relay lens assembly, and then reflected from a reflecting surface on the prism block to the film strip in a position adjacent to the blue image. The two dichroic mirrors pass virtually all of the non-reflected light, the light transmitted by the second dichroic mirror being for example, green. The green image is reflected similarly, first from an inclined reflecting surface of the prism block, then to a pair of front surface reflecting mirrors, then transmitted through a relay lens assembly for final reflection from a different surface of the prism block to the film strip and into adjacent relation with the red and blue images. The optical distances of the paths taken by the blue, red and green light beams are virtually equal as measured between the image plane in the field lens assembly and the plane of the film strip. To finally correct the optical system, as for any curvature of field, each color image may be transmitted through suitable thin negative lens means mounted at the aperture of the camera housing and adpated to act as field flatteners.

It will be noted that in this optical system the field lenses, dichroic mirrors, reflecting front surface mirrors, reimaging lenses and prism block may be rigidly mounted as a unit and installed as a unit between a selected taking lens and the aperture and claw movement of a normal camera. By the use of such assembly, a normal camera can be readily converted into a two or three color camera.

Figure 1:
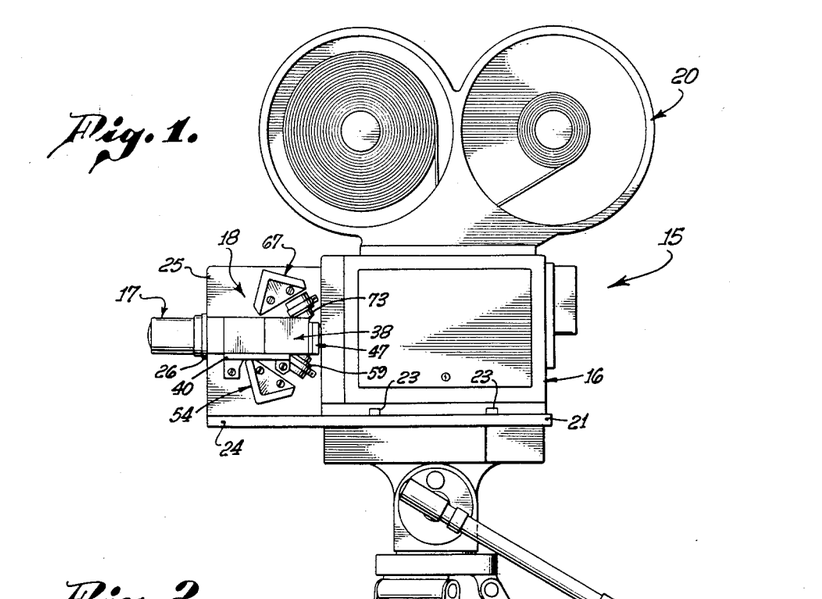
Fig. 1 is a side elevational view of a motion picture camera embodying the photographic system of this invention.

In the drawings, the entire camera, generally indicated at 15, and embodying this invention, may comprise any motion picture camera of well-known make and manufacture, as for example, a Mitchell camera. The camera 15 includes a camera housing 16, a taking or objective lens assembly 17, and a color separation and relay image means, generally indicated at 18, interposed between the camera housing 16 and the taking lens assembly 17. The color separation means 18 is in a light-tight case.

Within camera housing 16 is provided usual mechanism for controlling intermittent movement of a film strip. The forward end of the camera housing 16 may be provided with the usual aperture 19 and a rotatable shutter (not shown) operably positioned with respect to the film aperture for operation in well-known manner. The camera housing 16 may carry film strip mounting means generally indicated at 20. The camera housing 16 may be mounted upon a base 21 which is carried in well-known manner by a tripod or other support, generally indicated at 22.

Figures 3, 4, 5, 6, 7, 8:
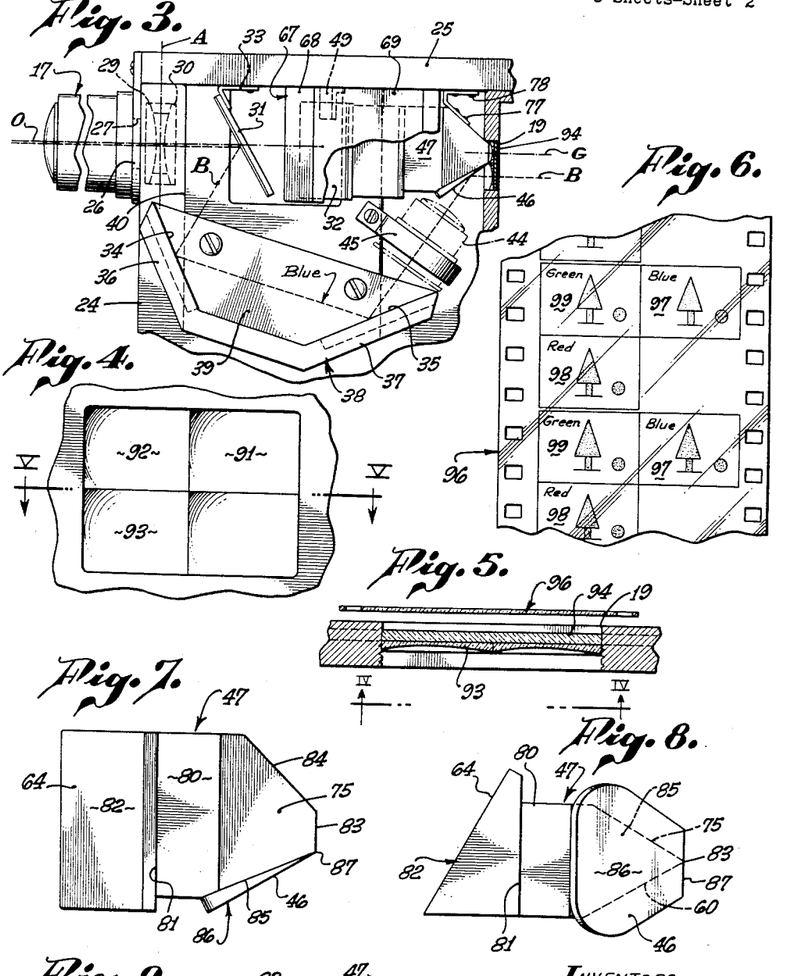
Fig. 3 is a top view of the fragmentary portion shown in Fig. 2.
Fig. 4 is an enlarged fragmentary view taken from the plane indicated by line IV—IV of Fig. 5.
Fig. 5 is a sectional view taken in the plane indicated by line V—V of Fig. 4.
Fig. 6 is an enlarged fragmentary view of a film strip illustrating the position of the several color images thereon.
Fig. 7 is a top plan view of a prism block employed in this invention.
Fig. 8 is a side view of Fig. 7.
Figure 9:
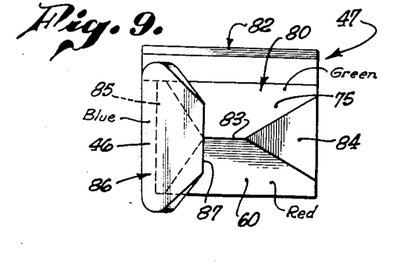
Fig. 9 is an end view taken from the right of Fig. 8.

The base 21 may include a pair of transversely extending, parallel, spaced ways 23 by which the camera housing 16 may be moved transversely to the right as is characteristic of a Mitchell camera. The base 21 includes a forwardly directed extension 24 projecting beyond the front wall of the housing, said extension being provided with a vertical, longitudinally extending support or mounting plate 25 along one longitudinal edge of the extension and lying parallel to the optical axis of the camera 15, as best seen in Fig. 3. The plate 25 may extend upwardly to approximately the height of the camera housing 16.

On the forward vertical edge of plate 25 may be mounted a transverse ported front wall 26 which extends across the optical axis of the camera and upon which the taking lens assembly 17 may be removably mounted in any suitable manner. The front wall 26 is provided with a light-transmitting aperture 27 aligned with the optical axis of the taking lens assembly 17. The taking lens assembly 17 may be any suitable combination of lenses selected for the particular photographic conditions present when photographing a selected subject.

The color separating and relay image means 18 of this invention is mounted upon and carried by the forward extension 26 of the base and the mounting plate 25. The means 18 serves to divide light transmitted through the taking lens assembly into three selected wave length bands, each transmitting an image in a selected color and relaying each color image along a separate path to the emulsion plane of the film strip 96, each color image lying adjacent to the other color images. All three images may lie within a single film frame.

The color separation and relay image means may include a pair of field lenses 29 and 30 suitably supported from the front wall 26 behind the aperture 27 and aligned with the optical axis O of the taking lens assembly 17. Each field lens 29 and 30 may be of planoconvex construction with the convex faces separated and in opposition. A real inverted image is produced by the taking lens assembly 17 and field lens 29 in an image plane A lying between said field lenses. The image at the image plane A contains virtually all of the light transmitted by the taking lens assembly 17. An extremely wide range of taking lens assemblies may be afforded by including the front field lens 29 as part of the taking lens assembly, the real image produced by said assemblies always lying in the image plane A.

The real image lying in the image plane A is a parallax-free, virtually two-dimensional image. Virtually all the light forming the image is transmitted rearwardly along the optical axis through the second field lens 30.

From the image beam transmitted through the second field lens 30, selected wave length bands are then separated by light-transmitting and reflecting means comprising, in the embodiment illustrated, two selected dichroic mirrors 31 and 32 which are positioned in spaced relationship, one behind the other along the optical axis O. Each dichroic mirror transmits and reflects a selected band of wave lengths and a combination of such mirrors is adapted to provide a tricolor separation of the wave lengths of light contained in the image beam. Each dichroic mirror, as used in the exemplary color separation means, may be described as a multilayer interference, dichroic, partial mirror made as by depositing selected, thin layers of various transparent material of different indices of refraction on a transparent support. It is understood other beam splitters may be used, such as aluminum splitters.

Dichroic mirror 31 may reflect a wave length band of light of about 400 to 500 millimicrons (blue light) while transmitting all of the other wave length bands of light. Dichroic mirror 32 may reflect wave length bands of light of about 600 to 700 millimicrons (red light) while transmitting the remaining wave length bands of light of approximately 500 to 600 millimicrons (green light). It should be noted that the dichroic mirrors are capable of transmitting or reflecting virtually all of the light of each selected color in the image beam. The dichroic mirrors thereby afford images of relatively high brilliance in each of the selected spectral regions. Virtually no light is lost by absorption.

The path of each color image is now traced and it should be noted that the lengths of the paths are equal as measured between the image plane A and the first surface encountered of a suitable reimaging lens assembly positioned in each path, as for example, the lens assembly 44, Fig. 3, or between the image plane A of the field lens and the plane of film 96.

The first dichroic mirror 31 may be carried by a bracket 33 suitably secured to plate 25. Dichroic mirror 31 may be vertically positioned at a selected angle of approximately 30° to a vertical plane lying perpendicularly to the optical axis O. Dichroic mirror 31 reflects a blue image along a path indicated by B, the path B lying generally in a horizontal planar zone. The blue image may be reflected successively from two suitably, angularly arranged front surface mirrors 34 and 35.

Mirrors 34 and 35 may be supported in angularly arranged, vertical, spaced walls 36 and 37, respectively, forming a mirror-mounting bracket 38. The bracket 38 includes a horizontally disposed, base wall 39 connecting said walls 36 and 37 and is adapted to be secured to a horizontal, sidewardly extending platform 40, the platform 40 lying beneath optical axis O and being secured to plate 25 by means of depending legs 41 and 42.

The blue image is reflected from front surface mirror 34 to front surface mirror 35 and thence to an adjustable reimaging lens assembly 44 carried by an annular mounting member 45 suitably secured to the platform 40. The axis of the lens assembly 44 is aligned with the path B of the blue image reflected from the mirror 35. The lens assembly 44 transmits the blue image to a vertically and angularly disposed, front, reflecting surface 46 provided on a prism or polyhedral block 47 which will be described in detail later on.

Figure 2:
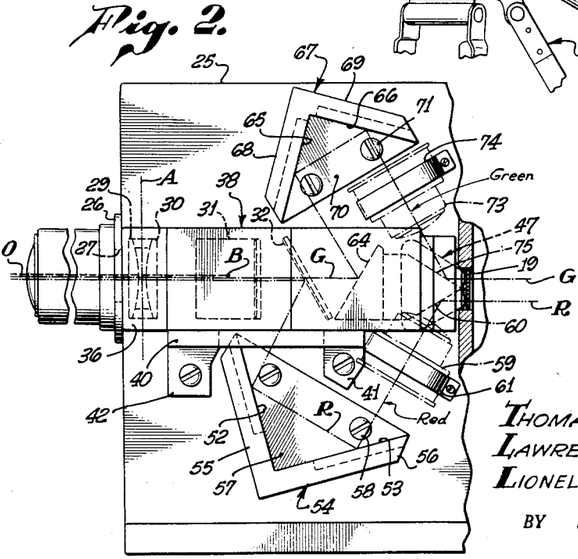
Fig. 2 is an enlarged view of the portion of Fig. 1 showing the arrangement of the color separation means.

The second dichroic mirror 32 may be carried by a bracket 49 also suitably secured to the plate 25. Dichroic mirror 32 may lie in a plane virtually perpendicular to the plate 25 and may be angularly positioned with respect to the optical axis O so as to downwardly reflect a red image along a path indicated by R, Fig. 2. The red image is similarly twice reflected from two suitably angularly arranged, front, surface mirrors 52 and 53.

The mirrors 52 and 53 may be carried by a suitable mounting bracket 54 located below the optical axis O and comprising angularly arranged walls 55 and 56 connected by a vertically disposed, mounting wall 57. The mounting wall 57 may be seated against the inner surface of plate 25 and secured thereto in any suitable manner as by screw means 58.

The red image is reflected from front surface mirror 52 to front surface mirror 53 and thence to a reimaging lens assembly 59 having its axis aligned with the path R of the red image. The lens assembly 59 is carried in an annular mounting member 61 secured to plate 25 and is adapted to transmit the red image upwardly and rearwardly to a reflecting surface 60 provided on the polyhedral block 47. It may be noted that the path of the reflected red image lies generally in a vertical planar zone.

The residue of the wave length bands of light transmitted by the dichroic mirrors 31 and 32 may be generally referred to as green light and the path of the green image is indicated by the letter G. The green image is first reflected from a diagonally arranged, upwardly and forwardly directed, front, reflecting surface 64 provided at the front of the polyhedral block 47. The green image is likewise reflected from two angularly arranged, front, surface mirrors 65 and 66 carried by a mirror-mounting bracket 67 having angularly disposed, generally downwardly facing walls 68 and 69. A mounting wall 70 connects walls 68 and 69 and is secured to plate 25 by screws 71. The green image is reflected from surface 64 to the mirror 65, then to mirror 66 and thence to a lens assembly 73 having its axis aligned with the path of the green image reflected from mirror 66.

The reimaging lens assembly 73 may be mounted in a suitable annular mounting member 74 which may be suitably secured to the plate 25. The lens assembly 73 transmits the green image for reflection from a rearwardly and upwardly inclined reflecting surface 75 provided on the polyhedral block 47. The path of the green image lies virtually in a vertical planar zone and above the optical axis.

It will thus be apparent that the pairs of mirrors 34 and 35, 52 and 53, and 65 and 66 provide light band director means for establishing the desired plurality of folded light band paths between the light-transmitting and reflecting means, or dichroic mirrors 31 and 32, and the reimaging lens assemblies 44, 59 and 73, respectively.

Each reimaging relay lens assembly 44, 59 and 73 may be substantially similar and may be of well-known make and manufacture. Each lens assembly 44, 59 and 73 selectively reduces in size the image upon which each of said assemblies is focused in image plane A. As noted heretofore, each lens assembly is mounted with the first surface of each assembly lying virtually the same or identical distance, as measured along the path of the associated color light beam, from the image plane A and each lens assembly 44, 59 and 73 is focused on the image plane A. Each of the reimaging lens assemblies may be adjustable and each is adapted to be focused on the film plane indicated generally by the film strip 96 which lies within the housing 16, the first conjugate distances of said assemblies being virtually equal.

Because the axes of the reimaging relay lens assemblies are at an angle to each other and to the plane of film 96, and because the reflecting surfaces between these lenses and the film are relatively close to the film plane, relatively large aperture lenses can be used. Moreover, it will be noted that these lenses are focused upon a virtually flat, two-dimensioinal image in the field lens assembly and not upon a three-dimensional object. Each relay lens handles but a single band of frequencies or wave length; chromatic aberration problems are reduced.

It will be seen, moreover, that this arrangement of the reimaging lens assemblies makes possible their relative disposition laterally of, and in similar proximity to, the single image plane of the film and in the restricted zone between the elements providing the light band director means and such single image plane.

The means by which the separate paths of the blue, red and green images are directed from the respective relay lens assemblies to the film strip include the polyhedral block 47 mounted upon plate 25 by an encircling member 77 which may be secured thereto in any suitable manner as by screws 78. The block 47 is non light-transmitting and may be made of any suitable material, such as optical glass, upon which may be readily provided the front reflecting surfaces 46, 60 and 75. The block 47 may include a forward, generally rectangular body portion 80 having a front surface 81 against which may be seated and secured as by cementing a generally triangularly shaped element 82 of suitable material, such as glass. The element 82 is provided with the reflecting surface 64 which is adapted to first reflect the green image.

Rearwardly of body portion 80, the block 47 is provided with the rearwardly directed reflecting surfaces 60 and 75, said surfaces lying generally perpendicularly to a vertical plane passing longitudinally through the optical axis. The surfaces 60 and 75 converge for intersection and termination in a straight, virtually horizontal knife edge 83 in proximity to the surface of the emulsion on film 96.

Triangularly configured sides 84 and 85 of the rearwardly directed portion of block 47 lie in converging, vertically disposed planes and terminate at respective ends of knife edge 83. The side 85 may carry a wedge-shaped member 86 which may be secured thereto as by cementing and which provides the reflecting surface 46 for the blue image. The element 86 terminates in a knife edge 87, which lies in the same plane and at right angles to the knife edge 83, the knife edge 87 extending downwardly from the edge 83 at one end thereof.

The angular relationship of the three rearwardly directed, adjacent, reflecting surfaces 46, 60 and 75 is adapted to reflect the respective blue, red and green images rearwardly about the same axis and in virtually parallel relation. The images transmitted by the three focusing lens assemblies are reduced in size so that when they are reflected from their respective reflecting surfaces on the block 47 and fall upon the film strip 96, the three images are normally included within one film frame and are recorded on image areas in adjacent relation.

Each color image which passes through aperture 19 of the camera housing 16 and falls upon the film strip may include a certain amount of curvature of the image surface. To correct this curvature, field flattener lenses 91, 92 and 93 are provided, respectively, for each blue, green and red color image. The field flattener lenses may be negative lens of selected power of planoconcave form and may be mounted upon a plate glass member 94 in suitable manner and secured in said aperture 19. Each field flattener lens occupies the same relative position in the aperture as the colored images which pass therethrough. The field flattener lenses, as viewed in Fig. 4, are each of sufficient area to transmit in their entirety the respective color image reflected from the block 47. Each field flattener lens principally corrects the curvature of the image surface falling upon the film strip 96. It has some corrective effect on the lateral and longitudinal chromatism, astigmatism and spherical aberration introduced by the field lenses.

It may be noted that each reimaging relay lens, the associated field flattener lens, and the associated reflecting surface therebetween comprises a complete, folded, optical system which is radially symmetric. Each system is of large relative aperture and of long focal length as compared to the diameter of the image. A plurality of image-forming systems, each folded by a reflecting surface on the polyhedral block closely adjacent to the film plane, thus provides a plurality of closely adjacent, spaced images on the film plane, each image being smaller than the effective diameter of its lens system, and each system being radially symmetric. Thus the three, independent, exit pupils of each system of reimaging lens and flattener lens are virtually similar and the actual aperture area of each system is much larger than the image area and adjacent spacing between images so that when viewed from beyond the film plane the three systems appear to overlap.

The film strip 96 is intermittently movable across aperture 19 in well-known manner and between the aperture 19 and film strip a usual shutter means (not shown) of the camera may be operated. The film strip 96 may be of any selected type capable of being sensitive to the wave length bands of light transmitted by the color separation and relay image means, panchromatic film being generally used. The particular arrangement of the color images is illustrated in Fig. 6 wherein the green and red images lie in adjacent, longitudinal relation and occupy approximately one-half of a film frame. The blue image occupies one-quarter of the area of the film frame on the opposite side of the longitudinal axis of the film strip. The unused portion of the film frame receives no light as will be readily apparent from a consideration of the rearwardly directed surface of the block 47, and this space may be used for the inclusion of a neutral or other image, if desired.

It will be understood that the particular arrangement of the blue, red and green images upon the film strip may be varied if desired. The location of the blue image on one side of the longitudinal axis of the film strip may be desirable since it is contemplated that a film strip may include an emulsion sensitive only to blue light on one side of the film, while the other side of the film may contain emulsions sensitive to the red and green light. The film strip 96 may be processed in well-known manner.

The three color images are focused on the film plane by their respective relay lens assemblies, and each image contains a high degree of brilliance because virtually all of the light from the taking lens assembly is either reflected or transmitted by the dichroic mirrors to the film plane. Only relatively small amounts of light are lost in the relay of the images.

The polyhedral block 47 and each of the relay lens assemblies may be mounted for slight adjustment on the plate 25 so as to arrange the three color images in separate, adjacent relation within a film frame. It may be noted that the conjugate distances of the relay lens assemblies as measured from the image plane A to the film plane along the path of each color image are virtually equal.

It will be apparent to those skilled in the art that the color separation and image relay means may be fabricated and assembled as a unit on a modified base of a motion picture camera of standard manufacture and interposed between the camera housing and a taking lens assembly in order to convert a standard camera into one capable of photographically reproducing color separation images. The camera housing need not be modified with respect to the shutter means aperture and film operating mechanism.

It will be noted that the forward field lens 29 may, in some instances (particularly where a very wide angle or wide aperture lens is used as the objective 17), be a part of the objective lens assembly and be correlated thereto.

It is understood that selected light filters may be utilized if desired in the path of each reflected image at any suitable place in order to selectively vary the wave length bands of light reflected by the dichroic mirrors in order to produce a desired color rendition.

Some dichroic mirrors do not have a reflecting cutoff point at exactly the frequency desired, and a weak, highly selective filter may be used adjacent one or more of the reimaging relay lenses to impart the desired shade or cutoff point to the light passing therethrough.

While a cover for the color separation and relay image means is not illustrated on the drawings, it is understood that a light-tight cover or housing will be provided for the color separation means for sealing against stray light. The interior surface of the color separation means may be painted or covered with a nonreflecting black paint as is well known in the art.

It will be readily understood by those skilled in the art that the color separation camera of this invention provides an optical system free of parallax, capable of operating at extremely wide apertures with high efficiency and capable of being associated with a wide range of lenses. The provision of a reimaging relay system, together with a single objective lens which forms the primary image, eliminates parallax both in time and in geometric considerations, because each of the three color separation images produced by the system is taken from the same viewpoint at the same time. Photographic reproductions using the three, separate images are thus free from color fringing.

Since the optical system of this invention is capable of operating at extremely wide apertures with high efficiency, normal illumination levels as required for black and white photography are sufficient for the taking of photographs in color with this color separation camera. Prior color separation cameras were incapable of taking photographs at normal illumination levels because such prior cameras operated with small relative aperture and low efficiency.

The optical system of this invention permits a great flexibility and convenience in the use of lenses ranging from wide-angle lenses to telephoto lenses. The optical system of this color separation camera is a reimaging system rather than a primary image-forming system. The advantage of this arrangement is that only the objective lens need be changed in order to modify the angle of view of the entire system, the effective angle of the system being the same as the effective angle of view of the selected objective lens.

Because the reimaging system of this invention reduces the size of the primary image formed by the single objective lens, an increase in illumination of the reduced image at the film plane is effected. This increase in illumination is equal to the square of the ratio of lineal reduction. For example, in a typical ratio of lineal reduction of four, there is an increase of sixteen times in the brilliance of the final reduced image as compared to the primary image of the objective lens in a selected part of the spectrum. Under this example, an objective lens with a relative aperture of $f$ 6.8 will be the equivalent of a lens system operating at a relative aperture of $f$ 1.7 because of the effect of the relay reimaging means.

Thus, the color separation camera of this invention which provides a single objective lens, a field lens, dichroic color separation means and a folded, reimaging, relay, optical system which includes the polyhedral block and the flattening lens makes possible the taking of full color photographs with great flexibility of operation and under widely variant conditions of illumination. The provision of three, separate, closely spaced, adjacent, color images on a single film provides for economies of operation not possible with prior color separation cameras. The provision of three color separation images on a single film strip permits the use of the optical system of this invention in a direct manner for color television transmission at virtually the same cost as is found in black and white transmission. Obviously, the provision of three color separation images formed on a single film strip having high image brilliance and being free from parallax affords means for the reproduction of color by any one of many known methods.

The color separation camera of this invention thus provides an optical system having a very wide latitude in exposure and ability to reproduce subject matter having a wide range of contrast. The camera of this invention permits greater flexibility in printing methods and affords greater economy and more fidelity than integral tripack methods.

The embodiment of this invention described hereinabove illustrates an optical system of this invention used to produce color separation images of high brilliance on adjacent coplanar image areas on a motion picture film. In Figs. 10 to 16 there is diagrammatically illustrated the use of this optical system with television cameras or optical systems of a color television system in which color separation images are provided on faces of television cameras arranged laterally in a group about the exit portion of the optical system of Figs. 1 to 9.

Figure 10:
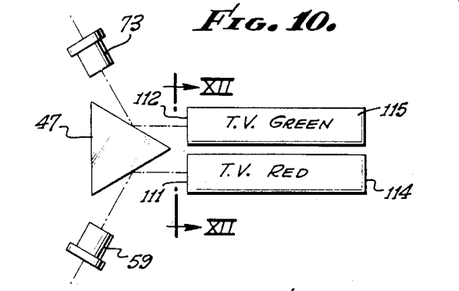
Fig. 10 is a diagrammatic view of the optical system for green and red light shown in Figs. 1–9, combined with television cameras, the view showing only the exit portion of the camera optical system including reimaging lenses and reflector means.
Figure 11:
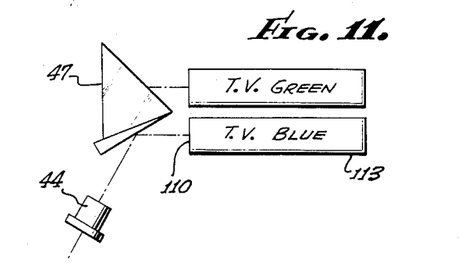
Fig. 11 is a diagrammatic view similar to Fig. 10 showing the path of blue light.
Figure 12:
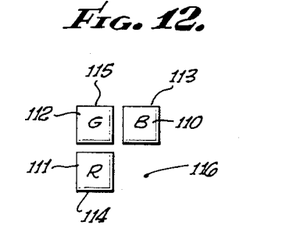
Fig. 12 is an elevational view taken from the plane indicated by line XII—XII of Fig. 10.

In Figs. 10 to 12, inclusive, such an exemplary arrangement is illustrated, only the exit portion of the optical system (including reflector means 47 and reimaging lens assemblies 44, 59 and 73) being shown, since the optical system forwardly thereof is identical to that shown in Figs. 1 to 9, inclusive. Like parts are given like reference numerals.

Reflector means 47 may be constructed the same as in the prior embodiment and is similarly operatively arranged with respect to the reimaging lens assemblies 44, 59 and 73, and disposed on the optical axes thereof. Reflector means 47 serves to direct color separation bands of light therefrom in parallel relation to respective image areas 110, 111, 112 provided on light sensitive faces of television cameras 113, 114 and 115. The blue, red, and green components of light received from the reflector means 47 generate in said television cameras video signals representative of these three component colors.

The cameras 113, 114 and 115 may be part of a video signal generating apparatus of well-known manufacture and each of said cameras may comprise an image orthicon tube, vidicon tube, or other light sensitive means, said tube being relatively small in diameter and providing a front light sensitive tube face which is also relatively small in area. Thus the cameras 113, 114 and 115 may be arranged with axes parallel in a group or cluster at the exit portion of the color separation optical system. The axis of each camera may be aligned with the axis of its associated light path, so that the cameras receive on separate, respective, image areas 110, 111 and 112 color separation images in a manner similar to that described above, wherein the image areas were provided in coplanar, adjacent relation on a motion picture film. As shown in Fig. 12 the faces 110, 111, 112 are arranged to receive color separation images in the same pattern as that provided on the film in Fig. 6. If desired, the blank space 116 in the quadrant arrangement of the image areas may be utilized as described in the prior embodiment.

Figure 13:
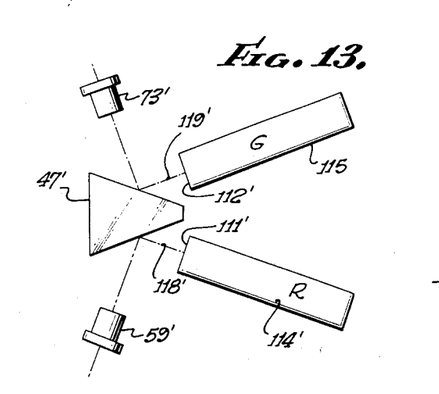
Fig. 13 is a diagrammatic view of a different arrangement of television cameras combined with the optical system of Figs. 1–9, the arrangement of the reimaging lenses and reflector means being modified slightly and showing the red and green light paths.
Figure 14:
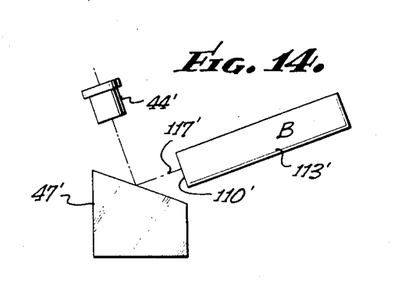
Fig. 14 is a diagrammatic view of the path of blue light for the modified arrangement shown in Fig. 13.

In the example shown in Figs. 13 and 14, reflector means 47' may be constructed somewhat differently from reflector means 47, but performs the same function and operates in a similar manner. In this example, reimaging lens assemblies 44', 59' and 73' may be arranged in the folded light path of the optical system so that the light directed from reflector means 47' may be disposed along divergent optical axes 117', 118' and 119', respectively. The divergent relationship of the axes 117', 118' and 119' facilitates lateral convergent grouping of television cameras 113', 114', and 115'. The television cameras are provided respectively with image areas 110', 111', 112' on their faces and said image areas are disposed in non-planar relation. It will be apparent that the image areas 110', 111' and 112' may be positioned quite closely to the reflector means 47' so as to provide a more restricted zone between the light band director means of the optical system and the respective planes of the image areas. Thus close lateral arrangement of the lens assemblies and the television cameras is facilitated.

Figure 15:
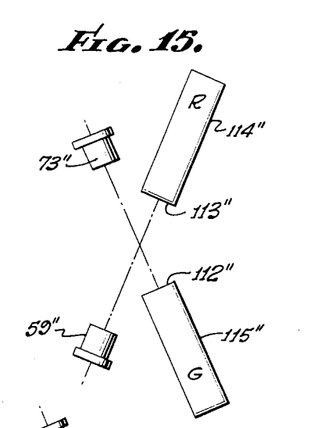
Figs. 15 and 16 are diagrammatic views of a still different arrangement of the reimaging lens assemblies and television cameras showing the red and green (Fig. 15) and blue (Fig. 16) light paths.
Figure 16:
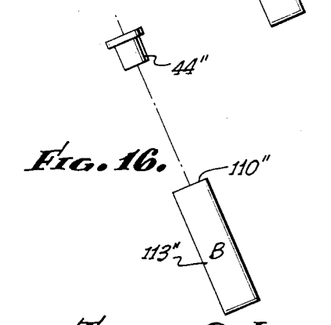

In the example of this invention shown in Fig. 15, the reflector means 47' is omitted from the optical system of the color separation camera. In this example, the light directed by the reimaging lens assemblies 44", 59" and 73" is transmitted directly to the respective faces 110", 111" and 112" of the respective television cameras 113", 114" and 115". It will thus be apparent in such an arrangement that the restricted zone between the image areas provided on the faces of the cameras and the light director means of the optical system may be relatively small and lateral grouping of the reimaging lens assemblies and the television cameras about the principal axis of the combined camera (that is, the axis of the objective lens) provides for drawing in or collapsing of the rear exit portion of the optical system.

It will thus be readily apparent to those skilled in the art that the color separation optical system described for the camera shown in Figs. 1 to 9, inclusive, may be readily combined with a color television camera system, whereby a television camera may be used at light levels considerably lower than the light levels at which television cameras operate at the present time. The image areas provided on the front faces of the television cameras may be coplanar (Figs. 10 to 12, inclusive) or they may be non-coplanare and arranged in planes disoposed at an angle to each other (Figs. 13 and 14, and Figs. 15 and 16). In each instance, color separation images of high brilliance are produced on the image areas provided on the television cameras by the optical system of this invention. A combined color separation optical system and television camera is thus provided in which all of the advantages of the optical system of the invention may be associated with television optical systems.

It is understood that varicus changes and modifications may be made in the optical system and television camera system described above, and all such changes and modifications coming within the scope of the appended claims are embraced thereby.

We claim:

1. A coaxial optical system of high brilliance for simultaneous production of at least three separate but associated color separation images in different portions of a single image plane having an area approximating that of a single frame of a motion picture film, comprising, in combination: an objective lens remote from said image plane portions; field lens means proximate to the objective lens and receiving all of the light transmitted by said objective lens and serving to establish a two-dimensional image at the field lens means; light transmitting and reflecting means on the extended optical axis of the field lens means to next receive light transmitted through the field lens means and to separate from said transmitted light selected wave length bands of light; light band director means for directing the separate bands of light in at least three separate folded light band paths, said light band director means and said single image plane providing between them a restricted zone; at least three re-imaging lens assemblies disposed laterally of said single image plane and in said restrcted zone and in similar proximity to said single image plane and each re-imaging lens assembly receiving a separate light band directed to it by a related light band director means; said re-imaging lens assemblies having a common focal plane at said two-dimensional image at the field lens means and each having a focal plane at said single image plane serving to produce at a said associated different portion of said single image plane an image of an area appreciably less than that of the two-dimensional image at said field lens means; said light transmitting and reflecting means lying optically between said field lens means and said light band director means.

2. A system as claimed in claim 1, in which said light transmitting and reflecting means comprise dichroic mirrors.

3. A system as claimed in claim 1, and including reflector means operatively arranged with respect to the re-imaging lens assemblies and disposed upon the optical axes thereof and serving to direct bands of light therefrom to the respective image plane portions.

4. A system as claimed in claim 1, in which said re-imaging lens assemblies are of relatively large aperture type.

5. A system as claimed in claim 1, in which said re-imaging lens assemblies are arranged in a group in spaced relation to each other and have the axes of their exit pupils convergently arranged.

6. A system as claimed in claim 3, in which said reflector means which is operatively arranged with respect to the re-imaging lens assemblies is provided with at least three relatively angularly disposed reflecting surfaces, and the re-imaging lens assemblies are arranged in a group in spaced relation to each other and in operative association with said reflector means and have the axes of their several exit pupils directed individually at individual reflecting surfaces of said reflector means for desired transmission to said different image plane portions.

7. A system as claimed in claim 3, including flattener lens means interposed between said reflector means and said image plane portions and disposed upon the optical axes of said bands of light.

8. A system as claimed in claim 1, wherein the focal length of the field lens means is such that the aperture of the objective lens is focused upon the nodal points of the re-imaging lens means, and the means for providing the several folded light band paths are such that these paths comprising their extent from the image plane of the field lens means to the separate image portions in the single image plane are of substantially equal length.

9. A system as claimed in claim 1, in which the single image plane lies within the aperture of a camera, and the other elements of said system are mounted upon a support rigidly associated with said camera.

10. A system as claimed in claim 1, in which said single image plane includes at least three image areas, each image area being provided on the face of a television camera.

11. A system as claimed in claim 1 wherein said single image plane is provided on television camera means.

12. A coaxial optical system of high brilliance for simultaneous production of at least three separate but associated color separation images in adjacent respective image areas, comprising, in combination: an objective lens for viewing a subject from a single point of view and in spaced relation to said image areas; field lens next to the objective lens and receiving all of the light beams transmitted by said objective lens and establishing a two-dimensional image at the field lens; light transmitting and reflecting means located on the extended optical axis of the field lens to next receive all of the light beams transmitted through the field lens and to divide the transmitted light beams into selected wave-length bands of light, each band transmitting said image along an axis optically coaxial with respect to the extended optical axis of the field lens; light-band director means positioned on the optical axis of each of said bands for next directing said separate bands of light in at least three separate folded light-band paths, said light-band director means being in laterally spaced relation with respect to said light transmitting and reflecting means and lying between said light transmitting and reflecting means and the image areas, said light transmitting and reflecting means lying optically between said field lens means and said light-band director means; and at least three re-imaging lens assemblies of short focal length and of large relative aperture in proximity to said image areas and each re-imaging lens assembly having its axis aligned with and on the optical axis of the separate light-band path directed to it by a related light-band director means, each re-imaging lens assembly having a common focal plane at said two-dimensional image and a focal plane at its associated image area, each of said re-imaging lens assemblies producing an image at said image area of appreciably reduced size as compared to the two-dimensional image at said field lens and of high brilliance, said re-imaging lens assemblies being separately focused to produce sharp images of the same size at said image areas.

13. A coaxial optical system of high brilliance for simultaneous production of at least three separate but associated color separation images in adjacent respective image areas, comprising, in combination: an objective lens for viewing a subject from a single point of view and in spaced relation to said image area; field lens next to the objective lens and receiving all of the light beams transmitted by said objective lens and establishing a two-dimensional image at the field lens; light transmitting and reflecting means located on the extended optical axis of the field lens to next receive all of the light beams transmitted through the field lens and to divide the transmitted light beams into selected wave-length bands of light, each band transmitting said image along an axis optically coaxial with respect to the extended optical axis of the field lens; light-band director means positioned on the optical axis of each of said bands for next directing said separate bands of light in at least three separate folded light-band paths, said light-band director means being in laterally spaced relation with respect to said light transmitting and reflecting means and lying between said light transmitting and reflecting means and the image areas, said light transmitting and reflecting means lying optically between said field lens means and said light-band director means; and at least three re-imaging lens assemblies of short focal length and of large relative aperture in proximity to said image areas and each re-imaging lens assembly having its axis aligned with and on the optical axis of the separate light-band path directed to it by a related light-band director means; and reflector means operatively arranged on the optical axes of said re-imaging lens assemblies and directing bands of light therefrom to respective image areas; each re-imaging lens assembly having a common focal plane at said two-dimensional image and a focal plane at its associated image area. each of said re-imaging lens assemblies producing an image at said image area of appreciably reduced size as compared to the two-dimensional image at said field lens and of high brilliance, said re-imaging lens assemblies being separately focused to provide sharp images of the same size at said image areas.

References Cited in the file of this patent

UNITED STATES PATENTS

| | | |
|---|---|---|
| 1,873,302 | De Francisco | Aug. 23, 1932 |
| 1,964,968 | Warmisham | July 3, 1934 |
| 2,204,049 | Planskoy | June 11, 1940 |
| 2,461,673 | Anschicks et al. | Feb. 15, 1949 |
| 2,600,590 | Thomas | June 17, 1952 |
| 2,658,103 | Sherman et al. | Nov. 3, 1953 |
| 2,672,072 | Sachtleben | Mar. 16, 1954 |
| 2,808,456 | Wittel | Oct. 1, 1957 |

FOREIGN PATENTS

| | | |
|---|---|---|
| 385,141 | Great Britain | Dec. 22, 1932 |
| 511,899 | Great Britain | Aug. 25, 1939 |